Patented Oct. 15, 1946

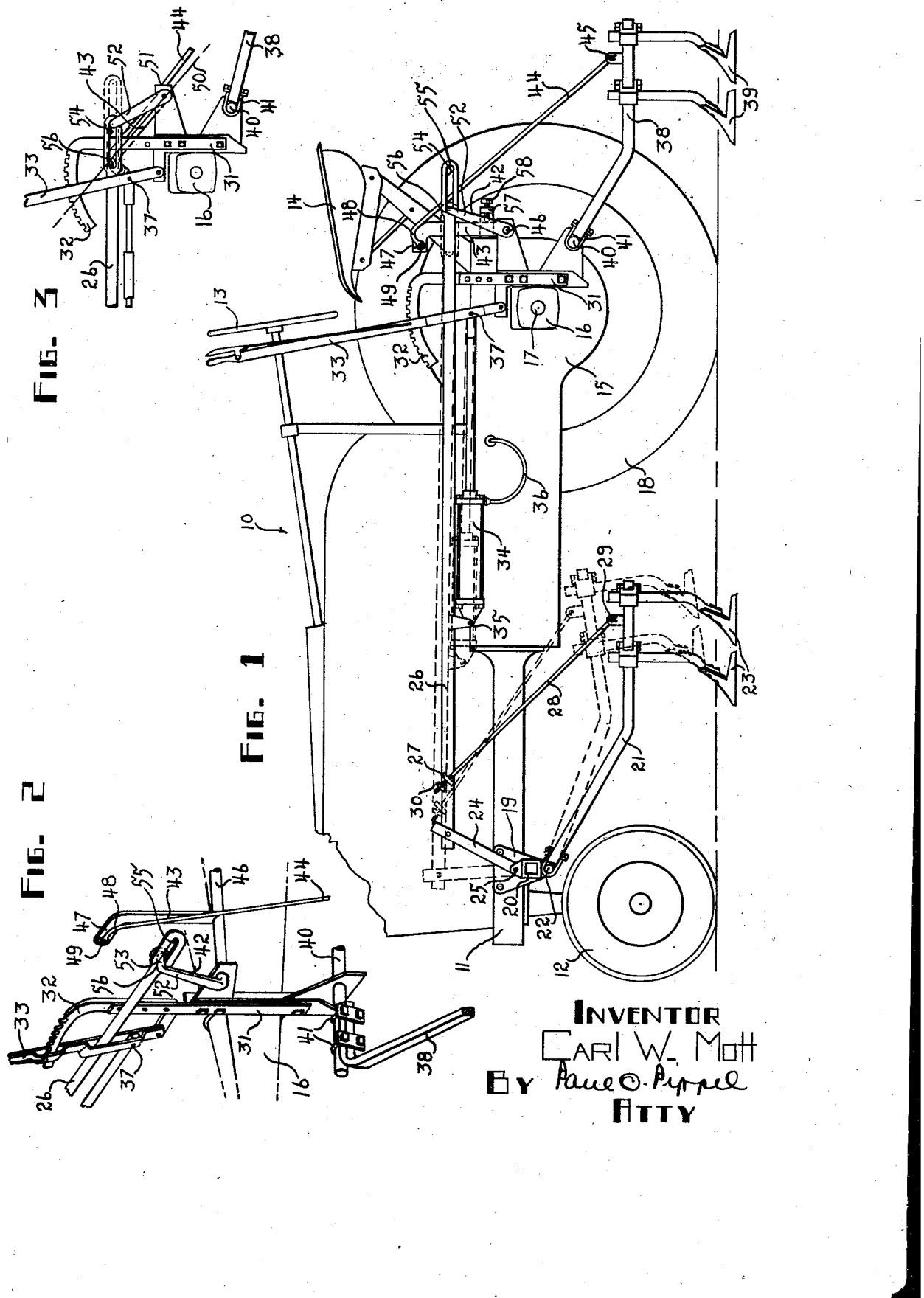

2,409,509

UNITED STATES PATENT OFFICE 2,409,509

TRACTOR-MOUNTED IMPLEMENT

Carl W. Mott, La Grange, Ill., assignor to International Harvester Company, a corporation of New Jersey Application June 16, 1941, Serial No. 398,181

7 Claims. (Cl. 97—47)

This invention relates to tractor-mounted implements and, more particularly, to the means for moving the working tools forming a part of the implement from one position to another position.

It is an object of the invention to provide a simple arrangement for the consecutive moving of working tools mounted on the tractor for separate movement with respect to each other.

It is another object of the invention to provide, in the means for moving the working tools on a tractor or tool-supporting frame, means which will serve to automatically lock the working tool against movement in one direction upon the same having been moved to one of its positions.

It is another object of the invention to provide means adapted to be associated with an overcenter locking means, whereby a working tool connected with the locking means can be adjusted relative to the tractor or relative to another working tool.

According to the present invention, means has been provided for the lifting of liftably mounted cultivator rigs located respectively on the forward and rearward portions of a tractor, wherein the forward rig is raised prior to the raising of the rearward rig. The connection of the moving means with the rear rig is of the lost motion variety and is cooperable with an associated overcenter locking device for obtaining the desired operational sequence of the rigs. By virtue of the lost-motion connection, which takes the form of a slot provided in a longitudinally extending lifting pipe, the forward rig is lifted before the lifting pipe becomes effective upon the overcenter locking device to effect lifting of the rear rig. When the overcenter device is finally operated to effect lifting of the rear rig, the same becomes effective to automatically lock the rear rig in its raised position. The locking device includes an arm and a link extending between the arm and the rear rig. As the arm is rotated by the moving means about its pivot axis, the connection of the link with the arm is thrown to a point beyond a center line extending between the arm axis and the point of connection of the link with the rig. Because of the lost motion in the lifting pipe rod, the forward rig can be returned to its ground-working position prior to the lowering of the rear rig. As the forward rig nears its ground position, the lost motion provided by the slot in the longitudinal pipe is taken up and then continued rearward movement of the lifting pipe will act against the overcenter device to throw the link beyond the center line and to thereby release the rear rig. Associated with the lifting device is a means for adjusting the same to adjust the working depth of the rear rig. This adjustment means will adjust the rear rig relative to the front rig and relative to the tractor.

For other objects and for a better understanding of the invention, reference may be had to the following detailed description taken in conjunction with the accompanying drawing, in which:

Figure 1 is a view in elevation of the tractor with a tractor-mounted implement embodying the features of the present invention;

Figure 2 is a perspective view of a portion of the implement showing particularly the overcenter locking device and the lost-motion connection with the same; and, Figure 3 is a view of a similar portion of the implement shown in Figure 2 but in elevation and with the overcenter device thrown into its locked position.

Referring now to the drawing, there is shown a tractor 10 having a forward portion 11 supported on a steerable axle structure 12 adaptable to be operated by the steering mechanism 13 accessible to an operator's station 14 located on a rear portion 15 of the tractor. The rear portion 15 includes a transverse axle structure 16 through which there extends an axle 17 for connection with a drive wheel 18 which serves to support the rear portion of the tractor. The tractor in its entirety serves as a tool-supporting structure to which working tools may be attached.

On the forward portion of the tractor there is provided a bracket structure 19 having a portion 20 extending transversely, to which is pivotally connected for vertical movement a cultivating or working-tool rig 21, as indicated at 22, the same having working tools 23 thereon. On this transverse portion of the bracket structure 19 is pivoted a fore and aft movable lever 24 at 25. To the free end of this fore and aft movable lever there is connected a longitudinally extending lifting pipe or member 26 which serves to operate the lifting lever 24. Connected to the lifting pipe, near to its intersection with the lever 24, is a flange 27 through which there extends a lift rod 28 connected to the cultivating rig 21 at 29. The upper end of the lift rod has an adjusting nut 30 which will be engaged by the flange 27 as the lifting pipe is moved forwardly. Continued forward movement of the lifting pipe will cause the cultivating rig 21 to be moved vertically, first to the position indicated in dotted lines in Figure 1, and ultimately to a higher or transport position not shown.

On the rear portion of the tractor and connected to the rear axle structure 16 is a bracket structure 31 having formed on its upper end a quadrant 32. This bracket structure carries a lever 33 adapted to work over the quadrant 32 and serves as a reaction point against which a fluid device 34 reacts to effect forward movement of the lifting pipe 26 to which it is connected, as at 35. The fluid device after partial extension may assume the position shown in dotted lines in Figure 1. The fluid device 34 receives fluid through a fluid connection 36 leading from the inside of the tractor where there is provided a fluid pressure source adapted to be driven by power from the tractor. As a means for obtaining this fluid source, any fluid reservoir housing and pump, geared to the tractor power plant, may be used.

The fluid cylinder device 34 is connected to the lever 33, as indicated at 37, and hence any bodily movement of the lever 33 by the operator located on the operator's station 14 causes bodily movement of the cylinder device, lifting pipe, and of the forward cultivating rig 21. This manual adjusting lever 33 and its associated quadrant 32 serve as a means for adjusting the working depth of the forward cultivating rig 21.

Pivotally connected to the bracket structure 31 is a rear cultivating rig or working tool 38 having cultivating tools 39. As a means for pivotally connecting this cultivating rig 38 with the bracket structure, there is provided a transversely extending shaft 40 to which the rig 38 is pivotally connected by means of the U-shaped clamping bolts 41.

Also, on the bracket structure 31, is an overcenter device 42. This overcenter device includes a long arm 43 to the outer end of which there is connected a lift rod or link 44 which is connected to the rear rig 38 at 45. The arm 43 is rigidly connected to a transversely extending shaft 46 which serves as the pivot for the arm 43. It will be noted that the upper end of the arm 43 has an angularly bent portion 47 and that the link or lift rod 44, which likewise forms a part of the overcenter device, is also bent as indicated at 48. As the overcenter device is rotated in a counter-clockwise direction by means to be soon described, and to assume the position shown in Figure 3, the bent portion 47 of the arm 43 and the bent portion 48 of the link 44 are thrown somewhat into parallelism with each other. Since the actual connection of the bent portion 48 with the arm 47 is made at a point 49 angularly advanced of a center line 50 extending longitudinally through the main body portion of the arm 43, the point of connection 49 will be thrown overcenter and beyond a line extending between the axis of the shaft 46 through the connection 45 with the cultivator rig. When the rig has been so lifted, the actual pull of the rig tending to return to its ground position will be resisted by the arm 43, or, in other words, the arm 43 will be acted upon by such pull of the rig to tend to continue the counter-clockwise movement of said arm, but this counter-clockwise movement is prevented by the engagement of the link 44 with the shaft 46, as indicated at 51.

Also formed on the overcenter device 42 is an actuating arm 52 extending slightly at an angle with respect to the arm 43. The upper end of this arm has a laterally extending portion 53 adapted to protrude into a longitudinally extending slot 54 formed on the rearward end of the lifting pipe 26. This arm 52 serves as a support for the rearward end of the lifting pipe 26 and by this means the overcenter device is operated. As the lifting pipe 26 is extended forwardly by the fluid device 34, the lifting pipe 26 may move forwardly without the arm 52 until the transverse portion 53 thereof abuts the rearward end 55 of the slot. This intermediate stage in the forward movement of the lift pipe 26 is illustrated by the dotted lines in Figure 1. Additional forward movement of the lift pipe will cause elevation of the front rig to a transport position which is still higher than the dotted line position of Figure 1. This additional forward movement of the lift pipe lifts the rear rig to the transport position and conditions the overcenter device for retaining the rear rig in the transport position. The lift pipe 26, its slot 54, the arms 52 and 43 of the overcenter device 42 are shown in Figure 3 in their respective positions at the finish of said additional forward movement of the lift pipe. It should thus be apparent that the overcenter locking device forms a part of the lifting connections between the fluid device and the rear cultivator rig 38 and that the same is actuated by the same lifting connections automatically and at the appropriate time when the rear cultivating rig has been raised.

Both the forward and rearward cultivating rigs having been raised to their transport position and the rear cultivating rig having been located by the overcenter device 42 in its transport position, means is provided wherein a similar consecutive movement of the forward and rearward cultivating rigs may be had as the rigs are moved into their ground-working position. With the overcenter device 42 having assumed the position shown in Figure 3 and with the transverse portion 53 at the rear end 55 of the slot, there is provided by means of the slot 54 a lost motion which can be taken up upon the movement of the forward cultivating rig 21 to its ground-working position and upon the return movement of the lifting pipe 26. As the lifting pipe 26 moves rearwardly, the same may do so free of the overcenter device 42 until the forward end 56 of the slot 54 engages with the transverse portion 53. This position is illustrated by the dotted lines in Figure 3 and will be seen to occur when the lift pipe and front rig return substantially to the intermediate position shown by dotted lines in Figure 1. As the lift pipe continues rearwardly under the gravitational force received from the front rig, and substantially concurrently with the front tools 23 touching the ground, the front end 56 of the slot 54 will move the overcenter device 42 sufficiently clockwise to trip the same and permit the rear rig to drop to the cultivating position. This clockwise movement need be in force only for a short duration until the arm 43 is thrown back over the center line 50 provided between the axis of the shaft 46 and the point of connection 45 with the rear rig 38 and the continued movement of the overcenter device will then be effected by the gravity pull of the rear cultivating rig. The rear cultivating rig is then relatively free of the effect of its overcenter locking device. The front rig 21 in moving downwardly from the dotted line position in Figure 1 presses the nut 30 rearwardly against the ear 27 on the lift pipe whereby the arm 24 in support of the front end of this pipe is pulled backwardly over center so said arm and pipe finally gravitate to the full line position of Figure 1 incident to withdrawing the ear 27 along the lift rod 28 generally forwardly from the nut 30. It should now be apparent that there has been provided a simple arrangement for the effecting of consecutive lifting of forward and rearward cultivating rigs mounted for separate movement on tractors or other tool-supporting structures. It should also be apparent that there has been provided a simple locking device located in the lifting connections which will automatically lock a cultivating rig in its lifted position.

As a means for adjusting the rear cultivator rig 38 relative to the cultivator rig 21, there is provided an adjusting means 57 taking the form of an adjustable stop adapted to engage with the arm formed on the bracket structure 31 and having an adjusting bolt 58 arranged in the path of the arm 43 to be contacted by the same as the rear rig approaches its ground-working position. As the adjusting screw 58 is screwed forwardly, the cultivating rig will be given a more shallow operating depth, while as the screw is turned rearwardly the cultivating rig 38 will be given a position for greater working depth. This adjusting means is independent of the adjusting means 32 and 33 which serves to adjust the cultivating rig 21 on the forward portion of the tractor. It should thus be apparent that there has been provided also by the present invention means whereby the rear rig can be adjusted relative to the forward rig and that this means is associated with the overcenter device thereby making further for simplicity of construction.

While various changes may be made in the detail construction, it shall be understood that such changes shall be within the spirit and scope of the present invention, as defined by the appended claims.

What is claimed is:

1. In combination, a tool-supporting structure, working tools respectively connected to the tool-supporting structure for separate movement from one position to another position, oppositely movable means advanceable for successively moving the working tools and including a lost-motion connection with one of the tools whereby lost motion may be taken up prior to movement of the one tool, an overcenter device associated with the one tool and the lost-motion connection and being adapted to lock the same after movement from the one position to the other position and to be unlocked for permitting movement of such one tool back to the one position, said lost-motion connection facilitating retractive movement of said oppositely movable means while such one tool is locked in said other position, said oppositely movable means being operable to cause return of the other tool to its one position pursuant to said retractive movement, and means movable with said retractively moving means for unlocking the locking means following sufficient retractive movement for the other tool to have returned a substantial distance toward its one position.

2. In combination, a tractor having forward and rearward portions, ground-working tools connected respectively to the forward and rearward portions for vertical movement to and from their ground-working positions, means for successively moving the forward and rearward working tools including a fore and aft movable lifting member connected with the forward working tool and extending for connection with the rearward working tool, said lifting member having an elongated slot in its rearward end, means for connecting the rearward working tool with the lifting member having a portion adapted to lie within the elongated slot, the arrangement of the slot and portion being such that movement of the forward working tool is effected prior to movement of the rearward working tool.

3. In combination, a tractor having forward and rearward portions, a working tool connected to each of the portions for vertical movement from one position to another position, means for successively moving the forward and rearward working tools including a member having a lost-motion slot therein, means for connecting the member with the rearward working tool including a portion extending into the slot to cooperate with ends of the same, the arrangement of the slot and portion being such that movement of the forward working tool is effected prior to movement of the rearward working tool, locking means operable under control of said extending portion when the latter is moved in one direction by being abutted by one end of the slot to releasably lock the rear tool in said other position, and said locking means being unlockable to facilitate return movement of the rear tool to the one position under control of said extending portion when the latter is engaged and moved by the other end of said slot.

4. In combination, a tool-supporting structure, working tools respectively connected to the tool-supporting structure for separate movement from one position to another position, means for successively moving the respective working tools including a movable member connected with one of the working tools and extending for connection with the other working tool, said member having an elongated slot, means for connecting the other working tool with the movable member having a portion adapted to lie within the elongated slot, and means coming into play upon movement of the working tools to their other position for locking the other working tool in its other position whereby the other working tool will be positioned to be delayed in its return movement when the tools are moved back to their original positions, the said movable member serving to unlock the locking means when the same is moved to return the working tools.

5. In combination, a tool-supporting structure, working tools respectively connected to the tool-supporting structure for separate movement from one position to another position, means for successively moving the respective working tools including a movable member connected with one of the working tools and extending for connection with the other working tool, said member having an elongated slot, means for connecting the other working tool with the movable member having a portion adapted to lie within the elongated slot and means coming into play upon movement of the working tools to their other position for locking the other working tool in its other position whereby the other working tool will be positioned to be delayed in its return movement when the tools are returned to their original positions, and adjustable means associated with the locking means for varying the amount of movement of the other working tool relative to the one working tool and to the tool-supporting structure.

6. In combination, a tractor, working tools respectively connected to the tractor for separate vertical movement, oppositely movable means advanceable for successively moving the working tools, said oppositely movable means including a lost-motion connection with one of the working tools and a relatively tight connection with the other whereby said other is lifted prior to lifting of the one tool pursuant to advance of the oppositely movable means, an overcenter lock device in the connection with the one tool and lockable in an overcenter condition for retaining such tool in its raised position incident to retraction of the oppositely movable means and consequent lowering of the other tool, said overcenter device being adapted to be unlocked from such overcenter condition, and means movable by said oppositely movable means in its retractive movement to unlock the overcenter device upon the execution of a predetermined portion of its retractive movement.

7. In a lifting apparatus for front and rear ground-working tools liftably mounted respectively upon relatively forward and rear portions of a tool-carrying vehicle, rear tool-lifting means manipulatable for lifting the rear tool, front tool-lifting means manipulatable for lifting the front tool, reversibly movable means operably associated with said tool-lifting means and operable when advanced in one direction to manipulate said tool-lifting means for lifting said tools but having a lost-motion connection with the rear tool-lifting means to incur sequential lifting of the tools, causing lifting of the front tool prior to lifting of the rear tool, a lockable supporting structure carried by said vehicle and becoming self-locked to support the rear tool in its lifted position upon the lifting thereof, said reversibly movable means being operable upon retraction in the opposite direction, while the supporting structure supports the rear tool, to manipulate the front tool-lifting means for lowering the front tool and to so adjust the lost-motion connection that the reversibly movable means is inoperable therethrough upon the rear tool-lifting means for supporting the rear tool above the ground wherefore upon subsequent unlocking of said supporting structure the rear tool can descend, and means operable coordinately with the retraction of the reversibly movable means to unlock said supporting structure and thereby terminate its support of the rear tool in an advanced stage of such retraction.

CARL W. MOTT.